Figures 1, 2:
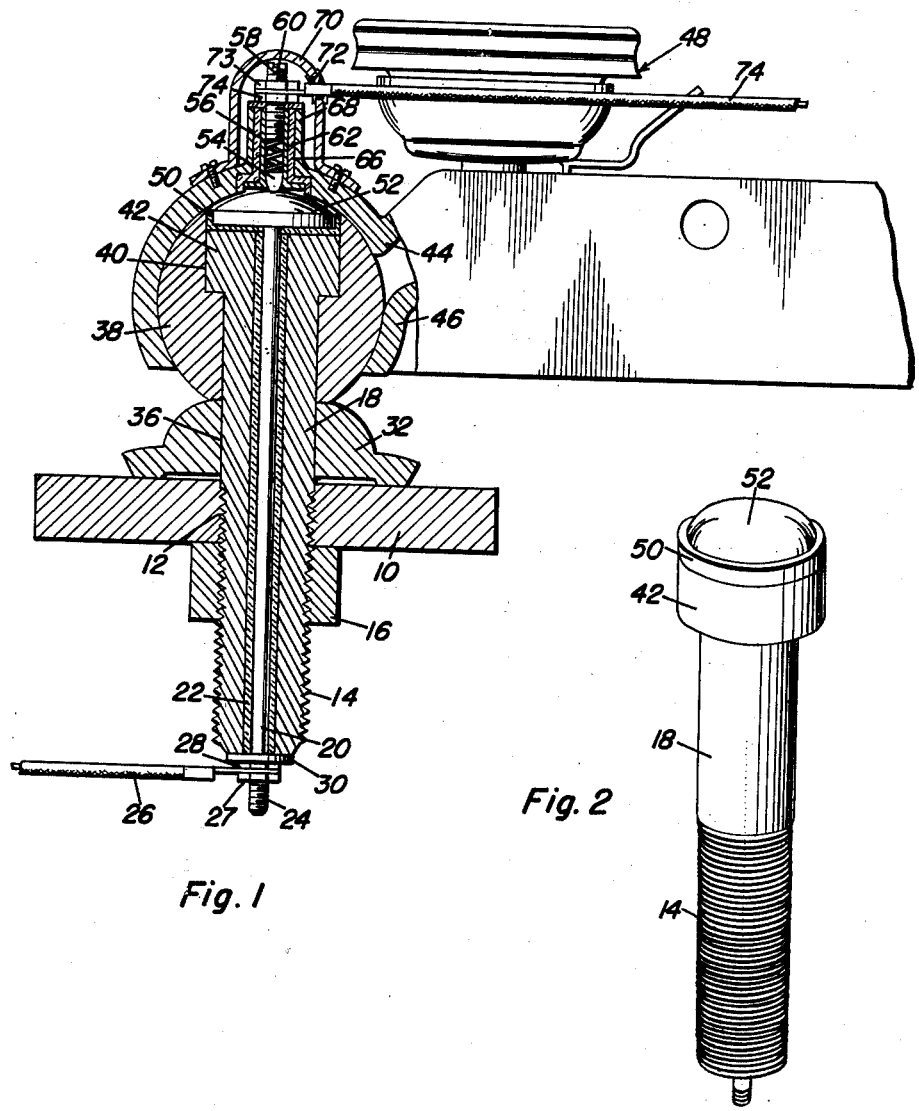

March 30, 1954     W. C. CASS     2,673,965
BALL AND SOCKET TRAILER HITCH WITH MEANS
TO CONDUCT CURRENT THERETHROUGH
Filed June 26, 1950

William C. Cass
INVENTOR.

Patented Mar. 30, 1954

2,673,965

UNITED STATES PATENT OFFICE 2,673,965

BALL AND SOCKET TRAILER HITCH WITH MEANS TO CONDUCT CURRENT THERETHROUGH

William C. Cass, Tyler, Tex.

Application June 26, 1950, Serial No. 170,355

1 Claim. (Cl. 339—7)

This invention relates to improvements in couplings for attachment of a trailer to a towing vehicle.

An object of this invention is to provide an improved connection for coupling a trailer to a vehicle which has provision for conducting current from the vehicle to the trailer warning light system.

Another object of this invention is to provide a stud with a conductor which is adapted to attach to an appropriate wire from the vehicle, together with a current pickup system or arrangement which is adapted to contact the conductor for conveying the current to the trailer signal lamps or to the other wiring, wherever found desirable.

Ancillary objects and features of importance will become apparent in following the description of the illustrated form of the invention.

In the drawings:

Figure 1 is an elevational view of a part of a coupling assembly, portions being broken away in section to illustrate the improved features therein; and, Figure 2 is a perspective view of the stud or bolt which forms a part of the coupling assembly having the conductor disposed therein.

In carrying out this invention I have provided an improvement in a conventional coupling whereby current may be conducted from the vehicle to the trailer. A bumper hitch-plate 10 is illustrated in the drawings and has the usual threaded opening 12 therein. A stud or bolt 18 having a lower threaded portion 14 is disposed in the threaded opening 12. A lock nut 16 is disposed on the threaded portion 14 of the stud 18 and bears against the lower surface of the bumper plate in order to hold the stud in the vertical position.

A conductor rod 20 passes through an axial bore in the stud 18 and is insulated from the stud by means of the sleeve 22 of conventional insulating material. The lower end of the conductor rod 20 is threaded as at 24 so that the wire 26 leading from a part of the electrical system of the towing vehicle, preferably the electrical signal lamps system, may be held in place by means of the nuts 27 and 28. An insulating disk 30 is disposed between the nut 28 and the bottom end of the stud 18.

A collar 32 is provided with a central opening 36 through which the stud 18 passes and the collar rests upon the top surface of the bumper hitch-plate 10. The ball 38 is provided with a recess 40 at the upper part thereof to accommodate the head portion by means of the clamping jaws 44 and 46 which are operatively connected with the tightening assembly 48 of the hitch.

The head portion 42 of the stud has a cup shaped member 50 disposed on the top thereof which is of electrically insulating material. This cup accommodates the smoothly curved contact 52 which is secured to the conductor rod 20 and which is adapted to be engaged by the spring loaded contact 54.

The spring loaded contact forms a portion of the assembly to receive current from the contact 52. This assembly comprises the contact 54 which is pressed by means of the spring 56 in firm engagement with the contact 52. Said spring seats at one end on the contact 54 and at the other end of the adjustment screw 58 which has a screw driver slot 60 at the upper end thereof for adjustment purposes. The adjustment screw 58 is threaded in the bore of a sleeve 62 which is completely insulated from the upper jaw 42 by which it is supported. For this purpose the sleeve 66 of electrically insulating material is arranged concentrically therewith and disposed in the tube 68 formed integrally with the said jaw 44.

A dome shaped protective cover 70 is fixed to the jaw 44 by any suitable means, as the illustrated screws, and has an opening therein with a grommet 72 disposed in the opening. The wire 74 passes through the grommet 72 and is attached to the adjustment screw 58 by means of the nuts 73 and 74.

In operation the trailer is hitched to the tractor, as an ordinary vehicle of the automotive type. The wire 26 is secured to the conductive rod 20 and the wire 74 is secured to the adjustment screw 58. Then, a current may pass through the conductive rod 20, the conductor or contact 52, the sleeve 62 and spring 56 which are in engagement with the screw 58 and then through the wire 74 to the lamps of the trailer.

Having described the invention, what is claimed as new is:

A trailer hitch comprising a ball, an electric contact on said ball, a socket substantially enclosing the ball, a tube on said socket, an insulated sleeve in the tube, a sliding contact in said sleeve engaged with the first named contact, a binding post of uniform diameter throughout its length threadedly mounted for both inward and outward adjustment in the sleeve said binding post projecting from the sleeve and having a kerf in its outer end for receiving an adjusting tool, a coil spring mounted under compression between the post and the sliding contact and adjustable by said post, nuts threaded on the post providing common means for locking same in adjusted position and for connecting a conductor wire thereto, and a protective hood on the socket enclosing the binding post, the tube and the nuts in spaced relation thereto.

WILLIAM C. CASS.

References Cited in the file of this patent

UNITED STATES PATENTS

| Number | Name | Date |
|---|---|---|
| 284,805 | Brewtnall | Sept. 11, 1883 |
| 1,376,162 | Rigsby | Apr. 26, 1921 |
| 2,000,743 | Cohen | May 7, 1935 |
| 2,020,088 | Truswell | Nov. 5, 1935 |
| 2,143,322 | Knobel | Jan. 10, 1939 |
| 2,404,564 | Boehlke | July 23, 1946 |
| 2,564,520 | Blasdell | Aug. 14, 1951 |

FOREIGN PATENTS

| Number | Country | Date |
|---|---|---|
| 601,602 | France | Mar. 5, 1926 |
| 613,246 | Great Britain | Nov. 24, 1948 |